United States Patent [19]

Musick

[11] Patent Number: 4,623,108

[45] Date of Patent: Nov. 18, 1986

[54] AIRPLANE

[76] Inventor: Stanley D. Musick, 2227 Sherer Ave., Dayton, Ohio 45414

[21] Appl. No.: 581,489

[22] Filed: Feb. 17, 1984

[51] Int. Cl.$^4$ .............................................. B64C 1/26
[52] U.S. Cl. .............................. 244/13; 244/DIG. 14
[58] Field of Search .................. 244/DIG. 1, 4 R, 13, 244/139

[56] References Cited

U.S. PATENT DOCUMENTS

| Re. 26,247 | 7/1968 | Jalbert | 244/142 |
| 3,135,483 | 6/1964 | Girard | 244/DIG. 1 |
| 4,424,945 | 1/1984 | Dell | 244/13 |

FOREIGN PATENT DOCUMENTS

| 467950 | 6/1914 | France | 244/139 |
| 8401346 | 4/1984 | PCT Int'l Appl. | 244/139 |
| 427517 | 6/1967 | Switzerland | 244/DIG. 1 |

OTHER PUBLICATIONS

"Free Flight Investigation of Radio-Controlled Models with Parawings", Donald E. Hewes, NASA TN D-927, Sep. 1961.

"Parafoil Powered Flight Performance", John D. Nicolaides, Technical Report AFFDL-72-23, Jan. 1973, pp. 20, 23 and 25.

"Flight Test Results of a Powered Parafoil System" AFFDL-TR-76-15, Dr. John T. Nicolaides, 2/76, pp. 51–55.

"ParaPlane" pamphlet of ParaPlane Corporation, Pennsauken, New Jersey, (undated).

Primary Examiner—Galen L. Barefoot
Assistant Examiner—Rodney Corl
Attorney, Agent, or Firm—Biebel, French & Nauman

[57] ABSTRACT

A model aircraft of the flying canopy type employs a cloth canopy wing of the type shown in the U.S. patent of Jalbert, U.S. Pat. No. Re. 24,427, and includes a platform, a power plant on the platform, and a plurality of upstanding pylons mounted on the platform which attach to the triangular gussets of the Jalbert wing for supporting the wing in superimposed relation over the platform.

5 Claims, 4 Drawing Figures

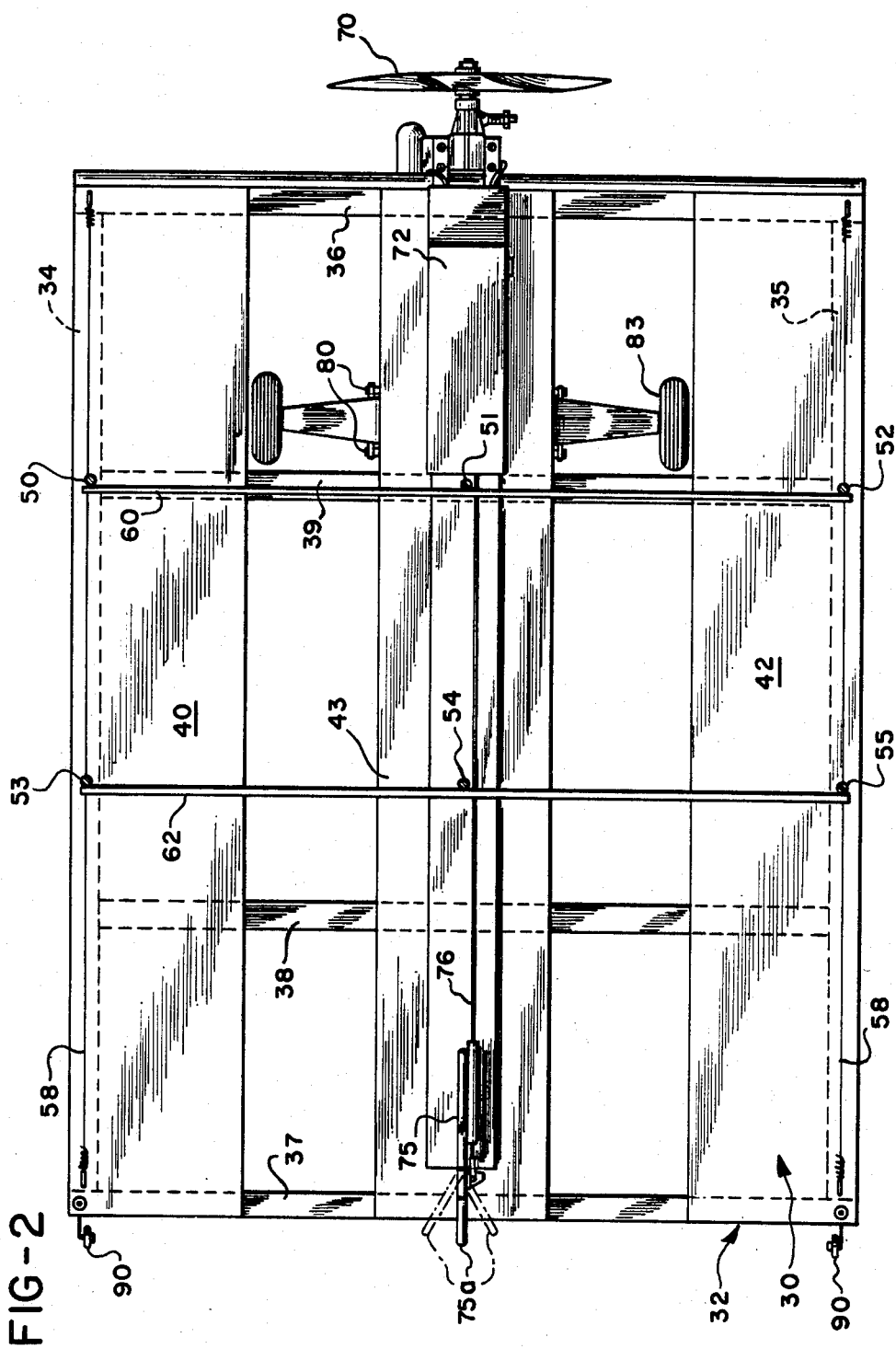

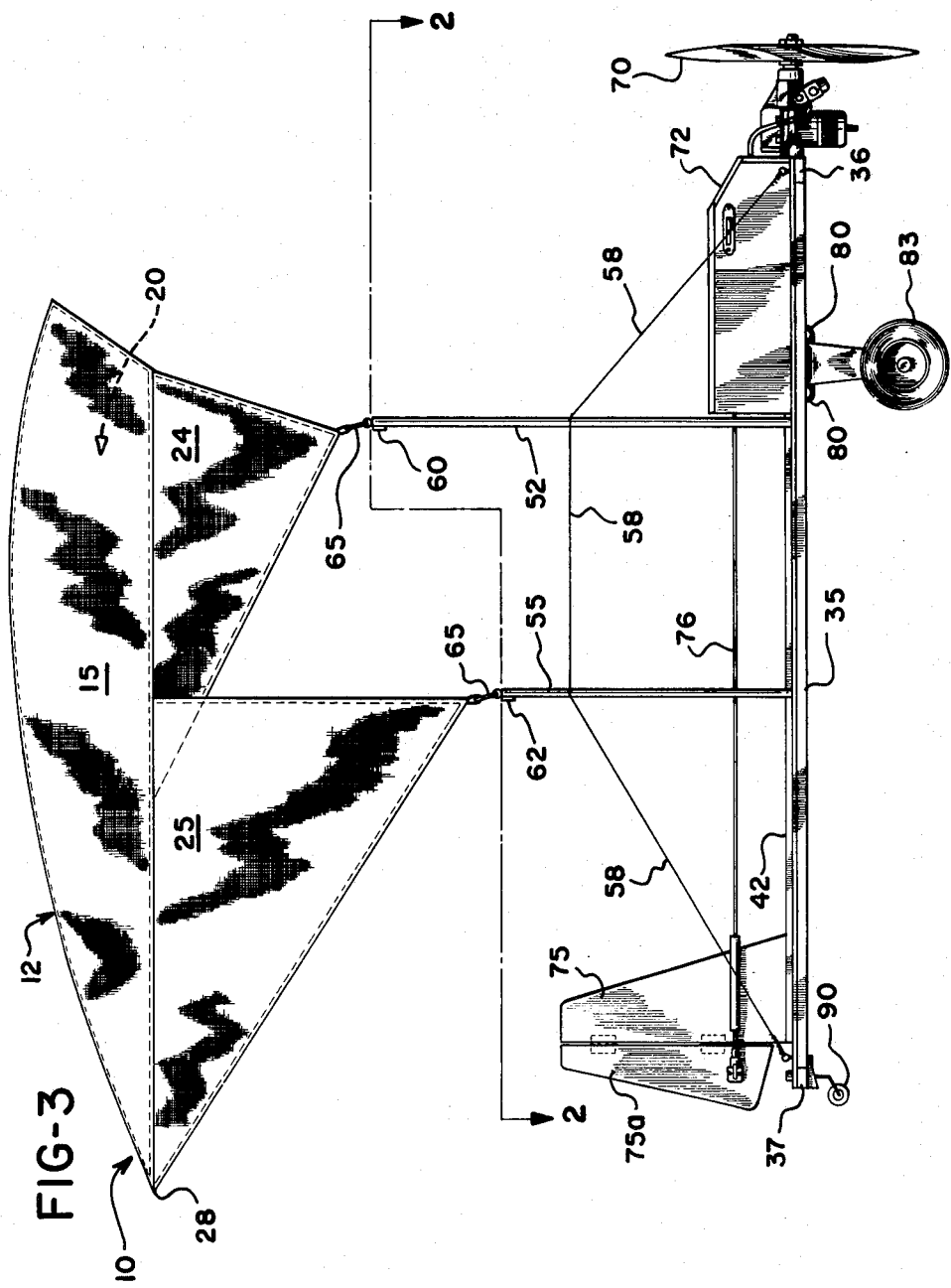

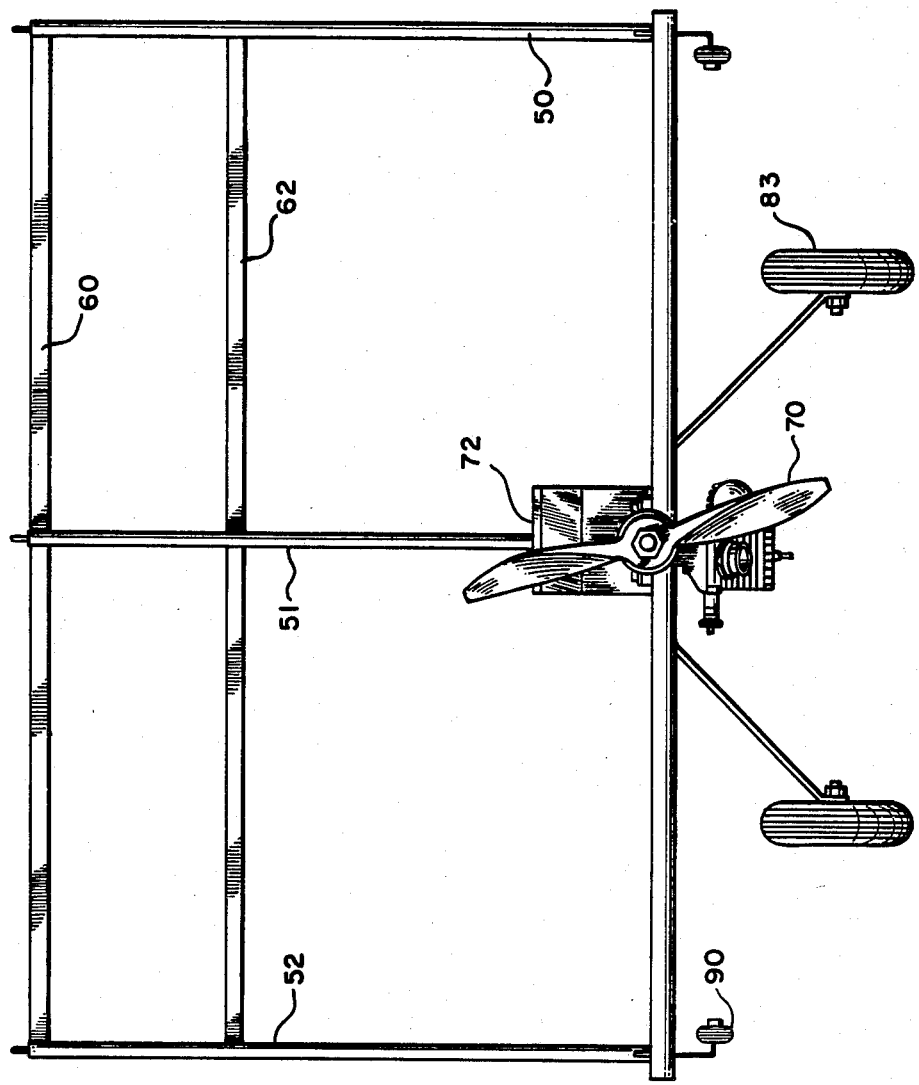

AIRPLANE

BACKGROUND OF THE INVENTION

This invention relates to airplanes and, more particularly, to a flying wing model such as a radio-controlled model which employs a multiple cell flexible canape lifting device of the type shown in the U.S. Pat. No. Re. 26,427, to Jalbert, issued July 16, 1968. In the above identified patent, Mr. Jalbert discloses a kite/parachute of the flexible canopy type which has an upper skin, a lower skin, and a plurality of fore and aft ribs which extend between the upper and lower skins to form a plurality of forwardly opening air cells which have a larger opening at the forward end than at the rearward end, forming the upper skin generally into the contour of an airfoil when the cells are inflated. The cells themselves are somewhat akin to wind socks, in that the air in the cells tend to rigidize the canopy and cause the same to assume its shape when fully expanded, under relatively light wind conditions of 10 knots or less.

The Jalbert parachute/kite is normally guided and supported by a plurality of downwardly depending triangular gusset sections which are sewn or otherwise suitably attached to the lower skin or surface, to which cord lines or shrouds are attached. The Jalbert canopy has been hailed by kite enthusiasts as one of the strongest and best devised kites of its kind, has become known by the name "Parafoil," and has been acclaimed for its high lifting power, its light weight and efficiency. It has not, however, to my knowledge been employed as the lifting device or wing in a self-contained, free flight powered vehicle.

SUMMARY OF THE INVENTION

I have found that an easily maneuverable flying platforms can be devised using the Jalbert parafoil as a lifting device. To this end, I provide a body or platform containing or supporting a power plant and provided with relatively rigid attachments to the depending parafoil triangular supports, in place of the flexible shroud lines. Such a platform, embodied in a radio-controlled model, for example, may be easily flown and maneuvered by a simple two-axis controlled system, in which one input controls engine thrust for climbing or descending, while the other axis controls a simple rudder in the propeller blast area at the rear of the platform, for turning. In my preferred embodiment, the model is highly maneuverable without the use of ailerons or their equivalent for the purpose of banking or initiating turns.

When the power plant is operating, the initial movement of the platform during a take-off run causes the parafoil to inflate and assume its airfoil form. As soon as the lift exceeds the weight of the model, the model quickly becomes airborne. The inflated parafoil assumes approximately the shape of a thick section airfoil which is very efficient at low speeds and at high angles of attack. In fact, free fall is accomplished with sufficient forward movement of the airfoil to maintain a glide with the cells inflated and without stalling. The model, under such powerout conditions, is seldom subject to injury due to its gentle descent under the control of the parafoil.

It is extremely easy to fly, as the operation of the same requires only the most rudimentary aeronautical knowledge or flying skill on the part of the operator. The absence of elevator controls ensures that the model can be glided back to earth at a forward rate of speed and descent which assures that the wing remains in a flying condition, without stalling, while climb and descents may be readily made simply by modulating the power of the power plant, such as by controlling fuel quantity or the like.

The platform lends itself to a highly simplified construction, without the necessity for making ribs, struts, and other airframe elements, which are often easily damaged by a mishap in operating a model. The basic platform also lends itself to low cost, simplified production, and the openness permits a high degree of integrity of the parts to be maintained and promotes ease of inspection.

It is, accordingly, a principal object of this invention to provide an aircraft which employs a multiple cell parafoil wing of the Jalbert type as the lifting device.

A further object of the invention is the provision of a flying platform or the like incorporating a plurality of rigid connections, such as pylons, for attachment to the depending shrouds of a parafoil, capable of free flight and ready maneuverability.

These and other objects and advantages of the invention will be apparent from the following description, the accompanying drawings and the appended claims.

BRIEF DESCRIPTION OF THE DRAWINGS

FIG. 2 is a plan view of my platform, with the parafoil removed;

FIG. 3, taken generally along the line 2—2 of FIG. 3, is a side elevation thereof;

FIG. 4 is a front elevation thereof.

DETAILED DESCRIPTION OF THE PREFERRED EMBODIMENT

Figure 1:
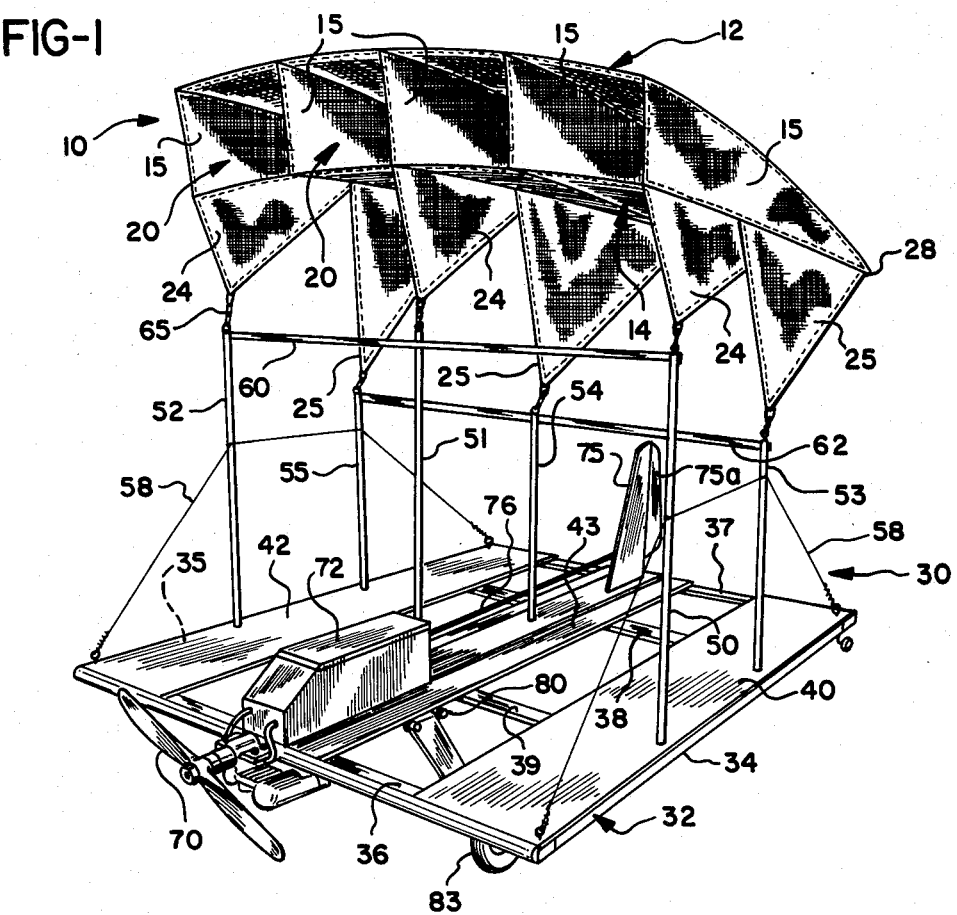
FIG. 1 is a perspective view of my invention.

Referring to the figures of the drawings which illustrate a preferred embodiment of the invention, a parafoil wing is illustrated generally at 10, constructed according to the teachings of the above-identified Jalbert U.S. Pat. No. Re.26,427. It is shown in the drawings in the inflated condition, that is, the condition assumed during taxiing and flight, and is formed as a canopy with an upper airfoil curved member 12 and a lower flat bottom 14. A plurality of vertically extending ribs or dividers 15 which are longitudinally spaced apart, extend between the upper member 12 and the bottom member 14, to form a plurality of substantially closed forward-opening air cells or compartments 20. Preferably, the canopy is formed of strong lightweight sail cloth material, such as nylon or Dacron.

The bottom 14 is provided with fore and aft depending triangular support sections 24 and 25. The forward sections 24 extend adjacent the leading edge of the parafoil, whereas the rearward triangular sections 25, which may somewhat overlap the forward sections 24, extend to the trailing edge, as shown in FIG. 3. The sections depend downwardly and terminate at downwardly pointing apices 28. In the model of the canopy 10 shown in FIG. 1, there are three sets or pairs of the triangular sections 24, 25, including two outer pairs and a centrally located inner pair, which are normally intended to be connected to shrouds or lines.

In my embodiment of the invention, the triangular panels or sections 24 and 25 are attached to an airframe body in the shape of a platform which I have illustrated generally at 30. The platform may consist of a generally rectangular encircling frame 32 which includes side rails 34 and 35, a front cross member 36, and a rear cross member 37, as best shown in FIG. 2. Platform 30 may also include a pair of cross members 38 and 39 extending between the side rails 34 and 35, for rigidity. Three horizontal platform sections are supported on the frame which has been described, including outer sections 40 and 42 and a central section 43. Platform sections 40, 42 and 43 extend the full fore and aft length of the frame 32 between the front and rear cross members, and are suitably attached to the framework and rails, such as by gluing.

The platforms 40, 42 and 43 support upstanding pylons. One pylon is provided for each triangular section of the canopy 10. Where the canope has a forward and rearward triangular sections, corresponding forward pylons 50, 51 and 52 are formed with a length which is somewhat greater than the rearward pylons 53, 54 and 55. The pylons form means for substantially rigidly attaching the platform to the wing and for supporting the parafoil above the platform. The parafoil bottom is either generally parallel to the plane of the platform or is at a slight positive angle of attack with respect to the platform. The lower end of the pylons 50 and 53 extending into the platform sections 40 where they are firmly mounted. Similarly, the pylons 51 and 54 are mounted on the platform section 43, and the pylons 52 and 55 are mounted on the platform section 42. Suitable guy wires 58 may be attached to the pylons and are connected to the platform for additional support. The upper ends of each of the forward pylons are joined and connected by a transverse support 60, joining the pylons 50, 51 and 52. A second transverse support 62 joining the pylons 53, 54 and 55, adjacent their upper ends.

The upper ends of each of the pylons are attached to a corresponding downwardly facing gusset at the apex by removable clip fasteners 65. In this manner, the canope may readily be attached to platform 30.

A conventional propeller driven power plant in the form of a model aircraft engine and propeller combination 70 is mounted on the forward end of the central platform section 43. A box 72 mounted on the platform for containing the fuel tank, the controls and electronics. A conventional vertical rudder 75 is mounted at the rearward end of the central platform section 43 and includes a fixed section, and a movable section 75a. The control of the rudder may be through a conventional push rod 76 by an actuator within the control box 72. With reference to the side elevational view of FIG. 3, it will be seen that the control box 72 and the power plant 70 are positioned generally forward of the forward pilings 50, 51 and 52, thereby putting the center of gravity of the air frame portion portion substantially at or just forward of the leading edge of the canopy 10. It has been found that this positioning of the center of gravity with respect to the canopy assures a controlled power off descent or glide, while maintaining the air cells filled with air.

A landing gear includes struts 80 which are mounted on the underside of the forward portion of the central platform section 43 to support a pair of ground-engaging wheels 83. Taxi skids or small steerable caster wheels 90 may be carried on the rear transverse frame member 37.

The rigid upstanding pylons provide for positive control of the position and the flight of the canopy, and support the platform 30 in depending relation below the canopy at a predetermined angle of attack position of the airfoil section which is defined by the inflated canopy and the thrust line of the platform.

In the operation of the aircraft, it will be noted that the model has neither ailerons or elevators. Altitude is controlled by controlling the thrust of the engine 70 and turns are effected by turning the movable rudder section 75a. Thus, single two-axis radio control units may be used. When the model is released, the canopy will quickly fill with air and assume the position shown in FIGS. 1 and 3 with the individual cells 20 fully inflated. During free gliding conditions or free fall, with the engine 70 turned off or out of fuel, the canopy 12 acts as a parachute and gently controls the lowering of the platform 30 back to the ground at a descent rate of only a few feet per second, usually without any harm or damage to the supported platform. Since the parafoil is a high lift device, with relatively high drag, it is capable of supporting substantial payloads, and has been found to be highly controllable.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A flying canopy airplane, comprising an airfoil shaped cloth canopy having a plurality of depending attachments in the form of triangularly shaped gussets,
   means connecting said gussets to the bottom surface of said canopy with the apices thereof extending downwardly,
   an underlying generally rectangular planar platform,
   support means on said platform including a plurality of generally upwardly extendly pylons rigidly attached to said platform and having upper terminal ends,
   means directly said pylon upper terminal ends to said gussets at said apices thereof for supporting said canopy in generally fixed relation superimposed over said platform,
   a controllable propulsion engine mounted on said platform, at a forward end thereof, and a rudder mounted on said platform at the rear end thereof, said engine and said rudder providing the exclusive control of said flying canopy airplane whereby the flight of such airplane may be controlled by a two axis radio control unit.

2. A flying canopy airplane employing a canopy of the multiple cell wing type in which a forwardly opening canopy has an upper cloth member having an airfoil contour, a lower cloth member, with rib means between said members defining a plurality of longitudinally extending air cells, and having means defining a plurality of depending fore and aft supports which are attached to the lower member of the canopy, comprising means defining an airframe body, a power plant on said body for propelling the same through the air, a controllable rudder on said body, and a plurality of generally upstanding relatively rigid fore and aft members on said body, the longitudinal spacing of said fore and aft members on said airframe body corresponding generally to the longitudinal spacing of said fore and aft supports on said canopy, and means directly joining said fore and aft members with corresponding ones of said fore and aft supports, whereby said canopy is supported in relatively fixed superimposed relation over said body as a lifting device therefor.

3. A model airplane for use with a multiple cell wing-type lifting device in which a forwardly opening canopy has an upper member of airfoil contour, a lower member with means between said members for forming a plurality of longitudinally extending air cells, and with a plurality of depending wedge-shaped supports attached to the lower member of the canopy, comprising:
   a platform,
   a power plant on said platform for propelling the same through the air,
   a rudder on said platform for steering, and
   a plurality of generally upstanding pylons mounted on said platform, corresponding in number and position to the number and position of said wedge-shaped supports and having upper ends thereof attached at the lower apices of said supports; for supporting said lifting device in elevated relation to said platform whereby operation of said power plant causes forward movement of said platform and attached lifting device for free flight.

4. The model of claim 3 in which there are pairs of fore and aft supports on said lifting device, and corresponding fore and aft pylons on said platform.

5. The model of claim 4 in which said canopy has a lower generally flat surface which is supported in generally parallel relation to said platform.

* * * * *